H. A. HILLS.
UPRIGHT MULTISTAGE FILTER.
APPLICATION FILED MAY 7, 1917.
1,294,463.
Patented Feb. 18, 1919.
3 SHEETS—SHEET 1.
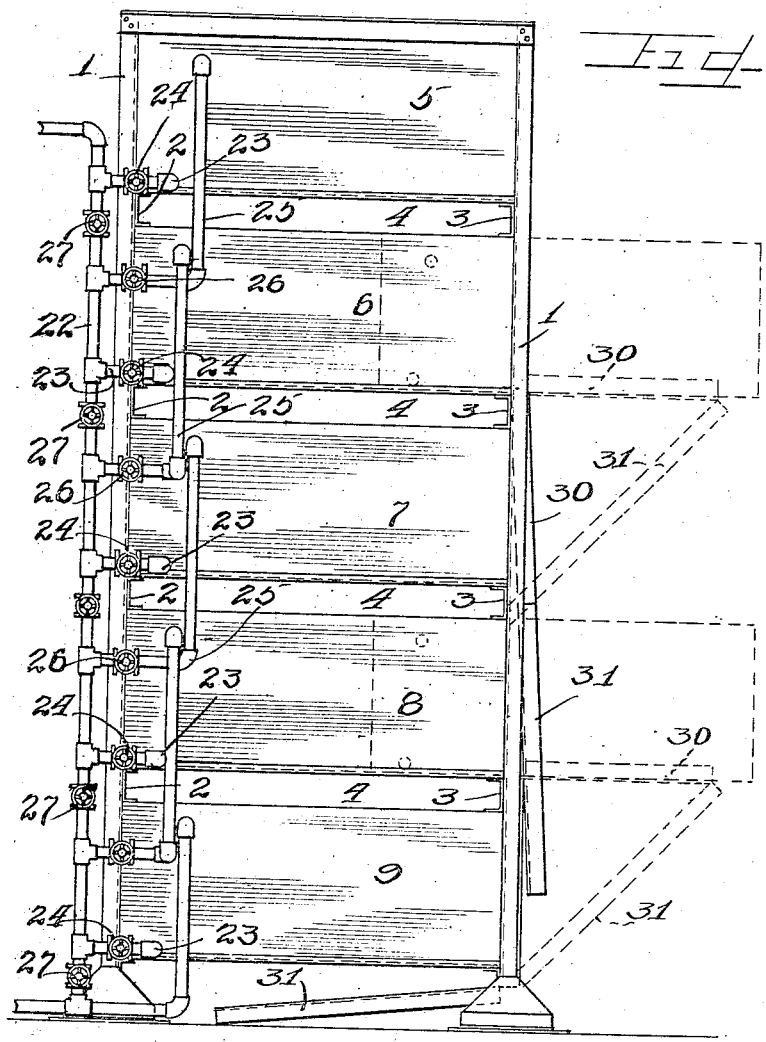
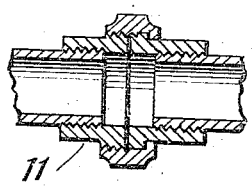

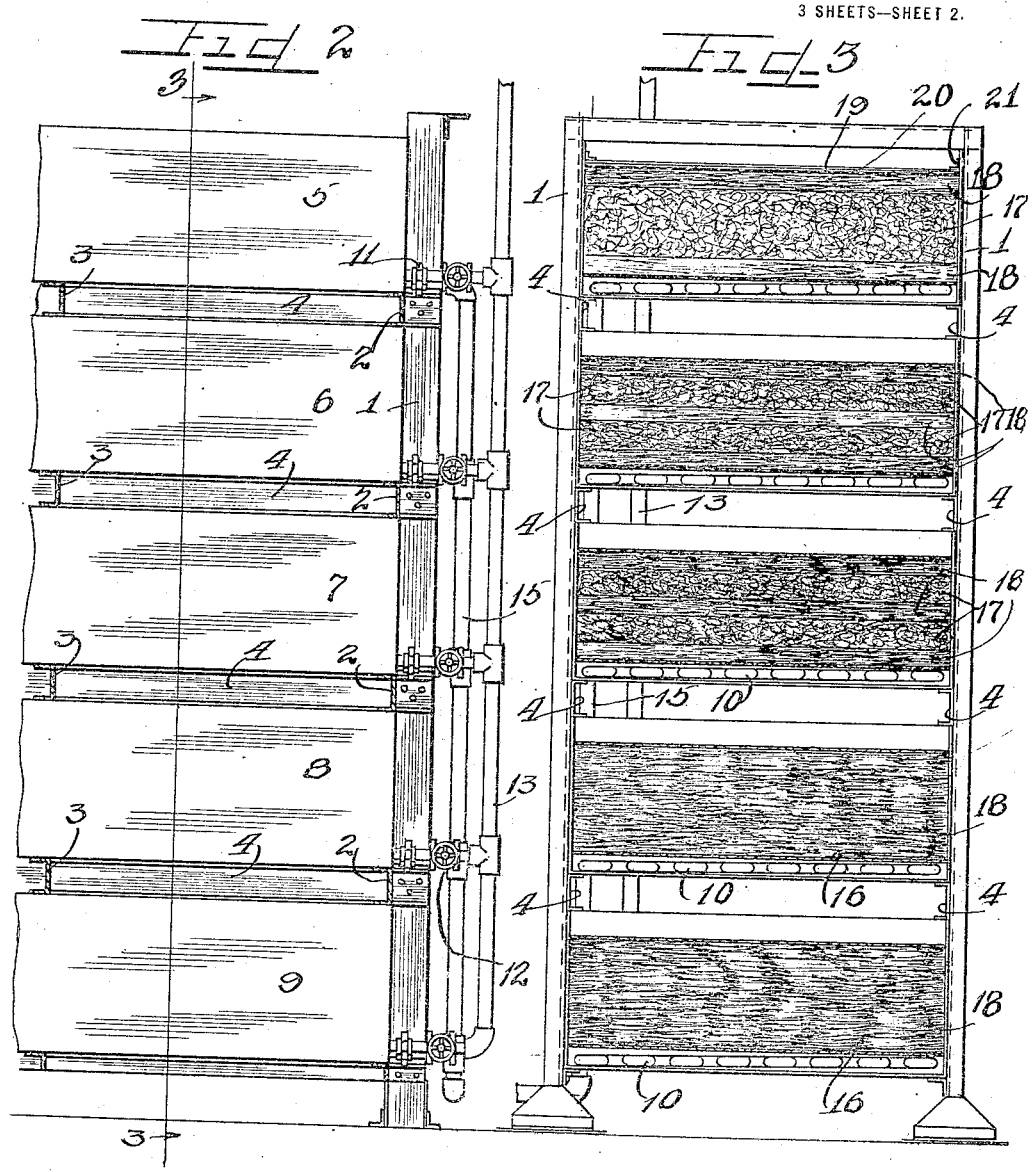

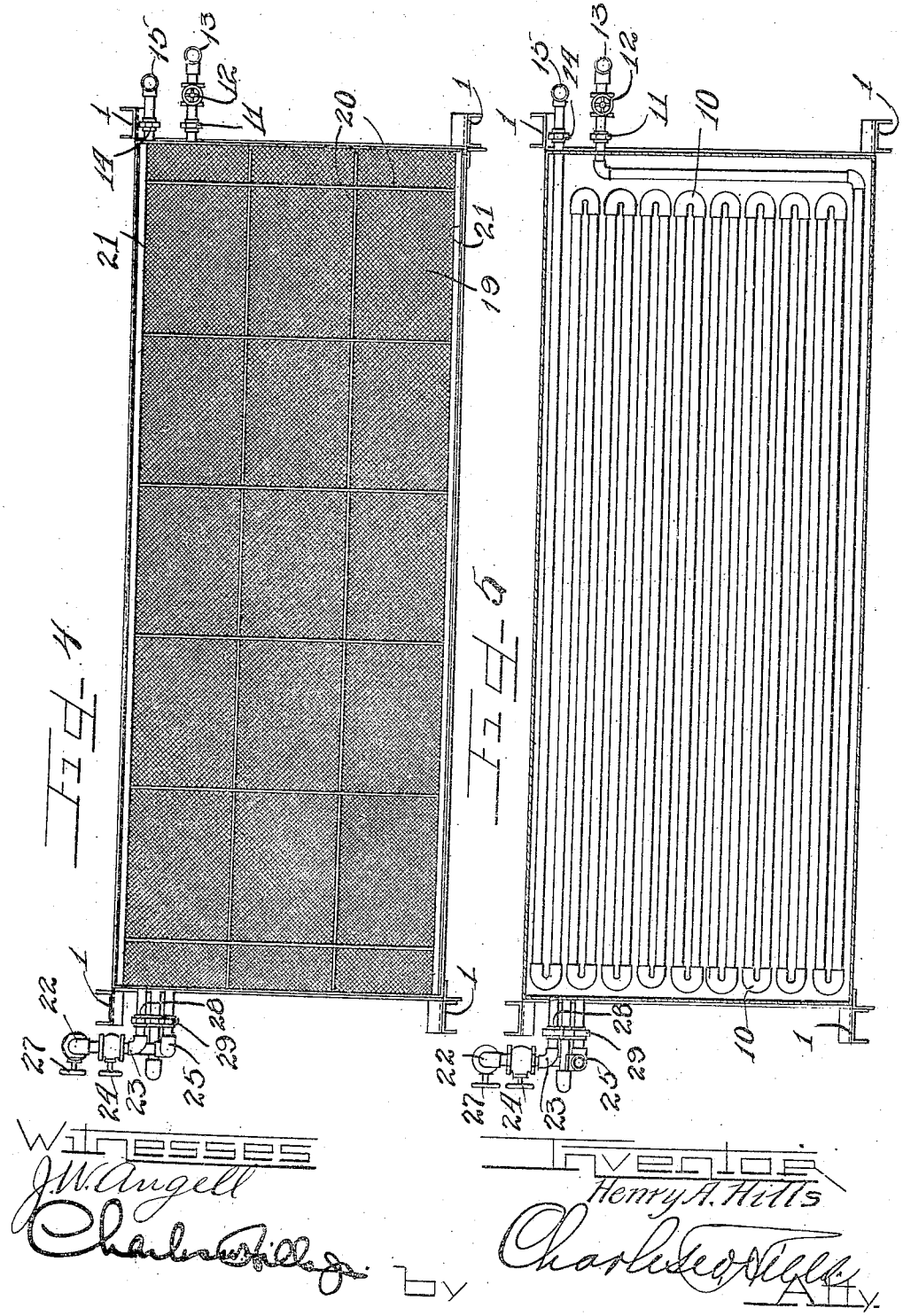

UNITED STATES PATENT OFFICE.

HENRY A. HILLS, OF GRAND RAPIDS, MICHIGAN.

UPRIGHT MULTISTAGE FILTER.

1,294,463.

Specification of Letters Patent.

Patented Feb. 18, 1919.

Application filed May 7, 1917. Serial No. 167,016.

*To all whom it may concern:*

Be it known that I, HENRY A. HILLS, a citizen of the United States, and a resident of the city of Grand Rapids, in the county of Kent and State of Michigan, have invented certain new and useful Improvements in Upright Multistage Filters: and I do hereby declare that the following is a full, clear, and exact description of the same, reference being had to the accompanying drawings, and the numerals of reference marked thereon, which form a part of this specification.

This invention relates to an improved type of filter apparatus requiring small floor space for installation, and provided with a number of filtering stages, through which the fluid to be filtered is caused to pass in successive order, and yet with the elements constituting a filter stage adapted to be cut out of operation without interrupting the filtering operation through the other stages of the apparatus. The apparatus is particularly adapted for use in power plants where a compact apparatus is desired, and only small space is available, but, of course, the filter is adapted for many other uses other than in power plants wherein it is desired to purify a fluid from suspended impurities therein.

It is an object therefore of this invention to construct an upright multi-stage filter apparatus wherein a number of filter tanks or compartment members are slidably mounted in an upright frame with easily detachable piping connections between the respective filter tanks to permit a flow of fluid through said tanks in successive order, and permitting any one or more than one of said tanks to be by-passed to permit withdrawal of a tank into an accessible position for cleaning purposes.

It is also an object of this invention to construct a filter apparatus embodying a plurality of filter compartments each one of which is independently removable from the apparatus by disconnection of the pipe line therefrom, and each provided with independent supporting means for cleaning the same when partially removed from the apparatus for cleaning purposes.

It is furthermore an important object of this invention to construct a unitary upright multi-stage filter apparatus wherein the various compartments constituting the stages are independently removable for cleaning, examination or repair, and with piping connections whereby the fluid is constrained to traverse a path through said stages in successive order, flowing upwardly through each thereof, and with by-pass connections around each of said stages for use during cleaning or repair thereof.

It is finally an object of this invention to construct a compact filter apparatus embracing a number of stages for filtering of the fluid through which the fluid is constrained to flow upwardly in its successive passage therethrough, and with means associated with the tanks of the several stages to support the same when withdrawn for cleaning or repair.

The invention (in a preferred form) is illustrated in the drawings and hereinafter more fully described.

In the drawings:

Figure 1 is a side elevation of a filter apparatus embodying the principles of my invention illustrating the possible movement of a filter tank in dotted lines.

Fig. 2 is a fragmentary view partly in section and partly in elevation illustrating the piping connections of the removable filter tanks.

Fig. 3 is a sectional view taken on line 3—3 of Fig. 1, with parts shown in elevation, and with parts omitted.

Fig. 4 is a top plan view of one of the filter compartment tanks.

Fig. 5 is a horizontal section taken through a filter compartment tank, illustrating the heating coils in plan view.

Fig. 6 is a sectional view of the union for detachably connecting the pipes with the tanks.

As shown on the drawings:

The filter apparatus is mounted in a frame structure comprising four upright channels 1, having transverse horizontal cross channels 2, at the front and similar cross channels 3, at the rear thereof, together with horizontal supporting side channels 4, which serve to support slidably thereon, filter compartment tanks 5, 6, 7, 8 and 9, respectively.

Disposed in the bottom of each of the filter compartment tanks, all of which are identical in construction, except for the composition of the filtering material itself, are steam heating coils 10, as clearly shown in Figs. 3 and 5. The inlet pipe of each set of coils is releasably connected through a union 11, and valve 12, to a steam supply line 13, which is disposed at one side at the front end of the filter apparatus. The outlet pipe from each set of said steam coils 10, is connected to a similar union 14, which is connected to a main steam exhaust line 15, also at the side of the filter apparatus.

As clearly shown in Fig. 3, within each of the filter tanks, a perforated tray or screen member 16, is mounted spaced slightly above the steam coils 10, and packed thereon is filtering material 17 and 18, respectively, of which the first filter tank 5, contains a greater quantity of the material 17, than the material 18, and the proportionate quantity of the material 18, increases in tanks 6 and 7, and is used entirely in tanks 8 and 9, said filtering material 18, being more impenetrable than the filtering material 17.

In order to confine the filtering material within the respective compartments, perforated tray or screen elements 19, are provided in each thereof, and are held downwardly upon the filtering material by transverse and longitudinal rods 20, the ends of certain ones of which engage beneath small angle irons 21, secured on the interior surfaces of the side walls of the compartment tanks. At the front end of the filter apparatus, a vertical main filter line 22, is provided, and communicating therewith, and with the lower front end at the side of each of the filter tanks 5, 6, 7, 8 and 9, respectively, are inlet pipes 23, each provided with a valve 24. An outlet pipe 25, communicates into each of the compartment filter tanks near the upper end thereof, and leads downwardly and communicates into the main filter line 22, through a valve 26. A plurality of valves 27, are connected into the main filter line 22, at the point therein between the connection of the respective inlet pipes 23, and outlet pipes 25, for one of the filter tanks.

As clearly shown in Figs. 4 and 5, the valve connections for the respective inlet and outlet pipes 23 and 25, are made through unions 28 and 29, respectively, similar to that shown in Fig. 6 so that said piping connections may be easily disconnected when it is desired to move one of the filter compartment tanks into the dotted line position shown in Fig. 1.

Provision is made for supporting a filter compartment tank when it is drawn rearwardly from the frame into the dotted line position shown in Fig. 1. For this purpose, mounted slidably upon each side of the respective filter compartment tanks and slidable upon the respective side channels 4, are angle iron track members 30, and pivoted to the outer end of each thereof is a swinging leg 31, which, when the compartment tank is drawn rearwardly, may be moved into the bracing position shown in Fig. 1, to support said track member and thereby support said filter tank for examination or repair.

The operation is as follows:

The fluid to be filtered is admitted into the upper end of the main filter line 22, and the fluid then flows through the first inlet pipe 23, through the open valve 24, (the first valve 27, being closed) into the lower end of the compartment filter tank 5, around the steam coils 10, therein, and percolates upwardly through the filtering material, and leaves by the outlet pipe 25 at the upper end of the tank. Said outlet pipe 25, leads downwardly, and through its valve 26, into the main filter line 22, by which the fluid progresses downwardly to the next inlet pipe 23, and flows thereby into the lower portion of the next filter tank 6, and this successive flow of the fluid during the course of filtration thereof takes place through the respective tanks 5, 6, 7, 8 and 9, in their respective order.

During normal operation of the filter, all of the by-pass valves 27, are closed, so that the fluid is constrained to pass into each of the respective filter tanks in successive order, and outwardly therefrom. However, if it becomes necessary to clean or repair a filter tank element, or replace the filtering material therein, it is only necessary to close the respective inlet and outlet valves 24 and 25, disconnect said inlet and outlet from the unions 28 and 29, open the by-pass valve 27, and at the connection of the steam coils 10, disconnecting the inlet and outlet pipe thereof from the unions 11 and 14, and the filter tank may be then withdrawn rearwardly in the frame into the dotted line position shown in Fig. 1, so as to be convenient for access. It is obvious therefore, that any one of the filter tank elements may be cut out of operation without interrupting the filtration process through the other of said filter tank elements. When a filter tank element is so withdrawn rearwardly, as shown in Fig. 1, a pair of braces or legs 31, which are hung conveniently on the filter frame, are used to support the movable or slidable track members 30, upon which the filter tank is supported in such position.

From the arrangement of the inlet and outlet pipes for the respective filter tanks, it is obvious that an upward flow of the fluid during filtration thereof takes place through each of said tanks, and it is for this reason that the rods 20, are provided extending longitudinally and transversely across the upper screen or perforated tray 19, within each tank to prevent the filtering material floating upwardly in the filter tank. The steam coils 10, serve to heat the fluid upon its entrance into each of the filtering tanks and the filtration process is aided to a great extent when the fluid is maintained in heated condition.

I am aware that various details of construction may be varied through a wide range without departing from the principles of this invention, and I therefore do not purpose limiting the patent granted otherwise than necessitated by the prior art.

I claim as my invention:

1. A filter apparatus of the class described comprising an upright frame, a plurality of filter-tanks mounted in superposed relation slidably in said frame, detachable inlet and outlet piping connections communicating into each of said tanks whereby a flow may be maintained therethrough in successive order, and means heating the fluid contents of each of said tanks during filtration.

2. In a filter apparatus of the class described, an upright frame, a plurality of filter tanks arranged in superposed relation slidably in said frame so as to be capable of withdrawal therefrom, and detachable piping connections connected into said respective filter tanks whereby the flow of fluid may be maintained therethrough in successive order.

3. In a filter apparatus of the class described, an upright frame, a plurality of filter tanks slidably mounted therein, piping connections releasably connected to said filter tanks for inlet and outlet of fluid therethrough, and by-pass connections to permit by-passing of any one of said tanks during a filtering operation to permit withdrawal of the tank from the frame.

4. In a filter apparatus of the class described, a plurality of filter tanks, each one thereof slidably mounted adapted to be withdrawn for inspection and repair, and releasable piping connections for inlet and outlet of fluid into said respective tanks whereby an upward flow of fluid through said tanks in successive order may be maintained.

5. In a filter apparatus of the class described, a plurality of superposed independent filter tanks slidably mounted to permit removal of any one thereof, and piping connections to introduce fluid into the uppermost of said tanks for upward flow therethrough and for successive flow through the remaining tanks upwardly through each thereof in successive order to the lowermost thereof during a filtering operation.

6. A filter apparatus of the class described comprising a plurality of slidably mounted superposed independent filter tanks, means affording communication therebetween whereby an upward flow of fluid through each thereof in successive order may be maintained during a filtering operation, and pipe sections provided with valves adjustable for interrupting the supply of fluid to be filtered from any one of the tanks and for conducting the fluid directly from the tank preceding to the tank succeeding such tank.

In testimony whereof I have hereunto subscribed my name in the presence of two subscribing witnesses:

HENRY A. HILLS.

Witnesses:
CHARLES W. HILLS, Jr.,
EARL M. HARDINE.

Copies of this patent may be obtained for five cents each, by addressing the "Commissioner of Patents, Washington, D. C."